(12) United States Patent
Yao et al.

(10) Patent No.: US 11,155,259 B2
(45) Date of Patent: Oct. 26, 2021

(54) SYSTEM AND METHOD FOR EGOCENTRIC-VISION BASED FUTURE VEHICLE LOCALIZATION

(71) Applicant: Honda Motor Co., Ltd., Tokyo (JP)

(72) Inventors: Yu Yao, Ann Arbor, MI (US); Mingze Xu, Bloomington, IN (US); Chiho Choi, San Jose, CA (US); Behzad Dariush, San Ramon, CA (US)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 16/386,964

(22) Filed: Apr. 17, 2019

(65) Prior Publication Data

US 2020/0086858 A1 Mar. 19, 2020

Related U.S. Application Data

(60) Provisional application No. 62/730,788, filed on Sep. 13, 2018.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G05D 1/0253* (2013.01);
(Continued)

(58) Field of Classification Search
CPC ............. B60W 30/09; B60W 30/0956; B60W 2420/42; G06T 7/74; G06T 7/248; G05D 1/0253
(Continued)

(56) References Cited

U.S. PATENT DOCUMENTS

2019/0243371 A1* 8/2019 Nister ................. G05D 1/0231
2019/0285752 A1* 9/2019 Chattopadhyay .. G06K 9/00805
(Continued)

OTHER PUBLICATIONS

Chen LC, Papandreou G, Kokkinos I, Murphy K, Yuille AL. Deeplab: Semantic image segmentation with deep convolutional nets, atrous convolution, and fully connected crfs. IEEE transactions on pattern analysis and machine intelligence. Apr. 1, 2018;40(4):834-48.
(Continued)

*Primary Examiner* — Yazan A Soofi
(74) *Attorney, Agent, or Firm* — Rankin, Hill & Clark LLP

(57) ABSTRACT

A system and method for egocentric-vision based future vehicle localization that include receiving at least one egocentric first person view image of a surrounding environment of a vehicle. The system and method also include encoding at least one past bounding box trajectory associated with at least one traffic participant that is captured within the at least one egocentric first person view image and encoding a dense optical flow of the egocentric first person view image associated with the at least one traffic participant. The system and method further include decoding at least one future bounding box associated with the at least one traffic participant based on a final hidden state of the at least one past bounding box trajectory encoding and the final hidden state of the dense optical flow encoding.

20 Claims, 8 Drawing Sheets

(51) Int. Cl.
    *G06T 7/246*     (2017.01)
    *G05D 1/02*     (2020.01)
    *G06T 7/73*     (2017.01)

(52) U.S. Cl.
    CPC ............... *G06T 7/248* (2017.01); *G06T 7/74* (2017.01); *B60W 2420/42* (2013.01); *G05D 2201/0213* (2013.01); *G06T 2207/30261* (2013.01)

(58) Field of Classification Search
    USPC .......................................................... 701/23
    See application file for complete search history.

(56) References Cited

U.S. PATENT DOCUMENTS

| | | | | |
|---|---|---|---|---|
| 2019/0359205 | A1* | 11/2019 | Xu | G05D 1/0253 |
| 2019/0392268 | A1* | 12/2019 | Tariq | G06K 9/00791 |
| 2020/0023842 | A1* | 1/2020 | Gutierrez | G06K 9/00805 |
| 2020/0082248 | A1* | 3/2020 | Villegas | G05D 1/0223 |
| 2020/0160559 | A1* | 5/2020 | Urtasun | G06K 9/629 |
| 2020/0210721 | A1* | 7/2020 | Goel | G06K 9/6267 |
| 2020/0353943 | A1* | 11/2020 | Siddiqui | G08G 5/0013 |

OTHER PUBLICATIONS

J. Wiest, M. Höffken, U. Kreβel, and K. Dietmayer, "Probabilistic trajectory prediction with gaussian mixture models," in IEEE Intelligent Vehicles Symposium (IV), 2012.
http://pytorch.org/.
A. Alahi, K. Goel, V. Ramanathan, A. Robicquet, L. Fei-Fei, and S. Savarese, "Social lstm: Human trajectory prediction in crowded spaces," in IEEE Conference on Computer Vision and Pattern Recog-nition (CVPR), 2016.
P. Anderson, Q. Wu, D. Teney, J. Bruce, M. Johnson, N. Sunderhauf, I. Reid, S. Gould, and A. van den Hengel, "Vision-and-language navigation: Interpreting visually-grounded navigation instructions in real environments," arXiv:1711.07280, 2017.
S. Ardeshir and A. Borji, "Ego2top: Matching viewers in egocentric and top-view videos," in European Conference on Computer Vision (ECCV), 2016.
G. Bertasius, H. S. Park, S. X. Yu, and J. Shi, "First person action-object detection with egonet," arXiv:1603.04908, 2016.
G. Bertasius, A. Chan, and J. Shi, "Egocentric basketball motion planning from a single first-person image," in IEEE Conference on Computer Vision and Pattern Recognition (CVPR), 2018.
A. Bewley, Z. Ge, L. Ott, F. Ramos, and B. Upcroft, "Simple online and realtime tracking," in IEEE International Conference on Image Processing (ICIP), 2016.
A. Bhattacharyya, M. Fritz, and B. Schiele, "Long-term on-board prediction of people in traffic scenes under uncertainty," in IEEE Conference on Computer Vision and Pattern Recognition (CVPR), 2018.
K. Cho, B. Van Merriënboer, C. Gulcehre, D. Bahdanau, F. Bougares, H. Schwenk, and Y. Bengio, "Learning phrase representations using rnn encoder-decoder for statistical machine translation," arXiv:1406. 1078, 2014.
J. Chung, C. Gulcehre, K. Cho, and Y. Bengio, "Gated feedback recurrent neural networks," in International Conference on Machine Learning (ICML), 2015.
J. Chung, C. Gulcehre, K. Cho, and Y. Bengio, "Empirical evaluation of gated recurrent neural networks on sequence modeling," arXiv:1412.3555, 2014.
F. Codevilla, M. Müller, A. Dosovitskiy, A. López, and V. Koltun, "End-to-end driving via conditional imitation learning," arXiv: 1710.02410, 2017.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in IEEE Conference on Computer Vision and Pattern Recognition (CVPR), 2016.

A. Das, S. Datta, G. Gkioxari, S. Lee, D. Parikh, and D. Batra, "Embodied question answering," arXiv: 1711.11543, 2017.
N. Deo, A. Rangesh, and M. M. Trivedi, "How would surround vehicles move? a unified framework for maneuver classification and motion prediction," IEEE Transactions on Intelligent Vehicles, Jun. 2018; 3(2):129-40.
N. Deo and M. M. Trivedi, "Convolutional social pooling for vehicle trajectory prediction," arXiv:1805.06771, 2018.
C. Fan, J. Lee, M. Xu, K. K. Singh, Y. J. Lee, D. J. Crandall, and M. S. Ryoo, "Identifying first-person camera wearers in third-person videos," arXiv: 1704.06340, 2017.
A. Fathi, A. Farhadi, and J. M. Rehg, "Understanding egocentric activities," in IEEE International Conference on Computer Vision (ICCV), 2011.
A. Geiger, P. Lenz, C. Stiller, and R. Urtasun, "Vision meets robotics: The kitti dataset," International Journal of Robotics Research (IJRR), 2013.
A. Gupta, J. Johnson, L. Fei-Fei, S. Savarese, and A. Alahi, "Social gan: Socially acceptable trajectories with generative adversarial networks," in IEEE Conference on Computer Vision and Pattern Recognition (CVPR), 2018.
K. He, G. Gkioxari, P. Dollar, and R. Girshick, "Mask r-CNN," in IEEE International Conference on Computer Vision (ICCV), 2017.
S. Hochreiter and J. Schmidhuber, "Long short-term memory," Neural computation, 1997.
E. Ilg, N. Mayer, T. Saikia, M. Keuper, A. Dosovitskiy, and T. Brox, "FlowNet 2.0: Evolution of optical flow estimation with deep networks," in IEEE Conference on Computer Vision and Pattern Recognition (CVPR), 2017.
D. Kingma and J. Ba, "Adam: A method for stochastic optimization," arXiv:1412.6980, 2014.
K. M. Kitani, T. Okabe, Y. Sato, and A. Sugimoto, "Fast unsupervised ego-action learning for first-person sports videos," in IEEE Conference on Computer Vision and Pattern Recognition (CVPR), 2011.
N. Lee, W. Choi, P. Vernaza, C. B. Choy, P. H. Torr, and M. Chandraker, "Desire: Distant future prediction in dynamic scenes with interacting agents," in IEEE Conference on Computer Vision and Pattern Recognition (CVPR), 2017, pp. 336-345.
Y. J. Lee and K. Grauman, "Predicting important objects for egocentric video summarization," International Journal of Computer Vision (IJCV), 2015.
Y. J. Lee, J. Ghosh, and K. Grauman, "Discovering important people and objects for egocentric video summarization," in IEEE Conference on Computer Vision and Pattern Recognition (CVPR), 2012.
Y. Li, Z. Ye, and J. M. Rehg, "Delving into egocentric actions," in IEEE Conference on Computer Vision and Pattern Recognition (CVPR), 2015.
Y. Li, A. Fathi, and J. M. Rehg, "Learning to predict gaze in egocentric video," in IEEE International Conference on Computer Vision (ICCV), 2013.
M. Ma, H. Fan, and K. M. Kitani, "Going deeper into first-person activity recognition," in IEEE Conference on Computer Vision and Pattern Recognition (CVPR), 2016.
R. Mur-Artal and J. D. Tardos, "ORB-SLAM2: An open-source SLAM system for monocular, stereo, and RGB-d cameras," IEEE Transactions on Robotics, 2017.
H. Pirsiavash and D. Ramanan, "Detecting activities of daily living in first-person camera views," in IEEE Conference an Computer Vision and Pattern Recognition (CVPR), 2012.
A. Sadeghian, F. Legros, M. Voisin, R. Vesel, A. Alahi, and S. Savarese, "Car-Net: Clairvoyant attentive recurrent network," in European Conference on Computer Vision (ECCV), 2018.
A. Sadeghian, V. Kosaraju, A. Sadeghian, N. Hirose, and S. Savarese, "Sophie: An attentive gan for predicting paths compliant to social and physical constraints," arXiv:1806.01482, 2018.
H. Soo Park, J.-J. Hwang, Y. Niu, and J. Shi, "Egocentric future localization," in IEEE Conference on Computer Vision and Pattern Recognition (CVPR), 2016.
Varshneya D, Srinivasaraghavan G. Human trajectory prediction using spatially aware deep attention models. arXiv preprint arXiv:1705. 09436. May 26, 2017.

(56) References Cited

OTHER PUBLICATIONS

S. Su, J. P. Hong, J. Shi, and H. S. Park, "Predicting behaviors of basketball players from first person videos," in IEEE Conference on Computer Vision and Pattern Recognition (CVPR), 2017.

M. Xu, C. Fan, Y. Wang, M. S. Ryoo, and D. J. Crandall, "Joint person segmentation and identification in synchronized first-and third-person videos," arXiv:1803.11217, 2018.

T. Yagi, K. Mangalam, R. Yonetani, and Y. Sato, "Future person localization in first-person videos," in IEEE Conference on Computer Vision and Pattern Recognition (CVPR), 2018.

X. Ye, Z. Lin, H. Li, S. Zheng, and Y. Yang, "Active object perceiver: Recognition-guided policy learning for object searching on mobile robots," arXiv:1807.11174, 2018.

\* cited by examiner

SYSTEM AND METHOD FOR EGOCENTRIC-VISION BASED FUTURE VEHICLE LOCALIZATION

CROSS-REFERENCE TO RELATED APPLICATION

This application claims priority to U.S. Provisional Application Ser. No. 62/730,788 filed on Sep. 13, 2018, which is expressly incorporated herein by reference.

BACKGROUND

Tasks in automated and advanced driving assist systems (ADAS) may require action and location prediction of participant vehicles. Future action prediction has been attempted using bird's eye view (BEV) imaging that are typically generated from surrounding cameras, LiDAR systems, or aerial photos. However, the applicability of the BEV images may be limited since most production vehicles are not equipped with the required sensors or services to capture the BEV images.

In many cases, BEV images may be generated by projecting LiDAR points to a ground plane. The projected images may be either created using unseen future frames or distorted by road irregularities as a nature of a transformation function. As a result, these solutions may not work consistently with general ADAS interfaces to develop effective predictive motion planning strategies.

BRIEF DESCRIPTION

According to one aspect, a computer-implemented method for egocentric-vision based future vehicle localization that includes receiving at least one egocentric first person view image of a surrounding environment of a vehicle. The computer-implemented method also includes encoding at least one past bounding box trajectory associated with at least one traffic participant that is captured within the at least one egocentric first person view image. A final hidden state of the at least one past bounding box trajectory encoding is output. The computer-implemented method additionally includes encoding a dense optical flow of the egocentric first person view image associated with the at least one traffic participant. A final hidden state of the dense optical flow encoding is output. Additionally, the computer-implemented method includes decoding at least one future bounding box associated with the at least one traffic participant based on the final hidden state of the at least one past bounding box trajectory encoding and the final hidden state of the dense optical flow encoding. The computer-implemented method further includes controlling the vehicle to be autonomously driven based on the at least one future bounding box associated with the at least one traffic participant.

According to another aspect, a system for egocentric-vision based future vehicle localization that includes a memory storing instructions when executed by a processor cause the processor to receive at least one egocentric first person view image of a surrounding environment of a vehicle. The instructions also cause the processor to encode at least one past bounding box trajectory associated with at least one traffic participant that is captured within the at least one egocentric first person view image. A final hidden state of the at least one past bounding box trajectory encoding is output. The instructions additionally cause the processor to encode a dense optical flow of the egocentric first person view image associated with the at least one traffic participant. A final hidden state of the dense optical flow encoding is output. Additionally, the instructions cause the processor to decode at least one future bounding box associated with the at least one traffic participant based on the final hidden state of the at least one past bounding box trajectory encoding and the final hidden state of the dense optical flow encoding. The instructions further cause the processor to control the vehicle to be autonomously driven based on the at least one future bounding box associated with the at least one traffic participant.

According to still another aspect, a non-transitory computer readable storage medium storing instructions that when executed by a computer, which includes a processor perform a method that includes receiving at least one egocentric first person view image of a surrounding environment of a vehicle. The method also includes encoding at least one past bounding box trajectory associated with at least one traffic participant that is captured within the at least one egocentric first person view image. A final hidden state of the at least one past bounding box trajectory encoding is output. The method additionally includes encoding a dense optical flow of the egocentric first person view image associated with the at least one traffic participant. A final hidden state of the dense optical flow encoding is output. Additionally, the method includes decoding at least one future bounding box associated with the at least one traffic participant based on the final hidden state of the at least one past bounding box trajectory encoding and the final hidden state of the dense optical flow encoding. The method further includes controlling the vehicle to be autonomously driven based on the at least one future bounding box associated with the at least one traffic participant.

DETAILED DESCRIPTION

Figure 1:
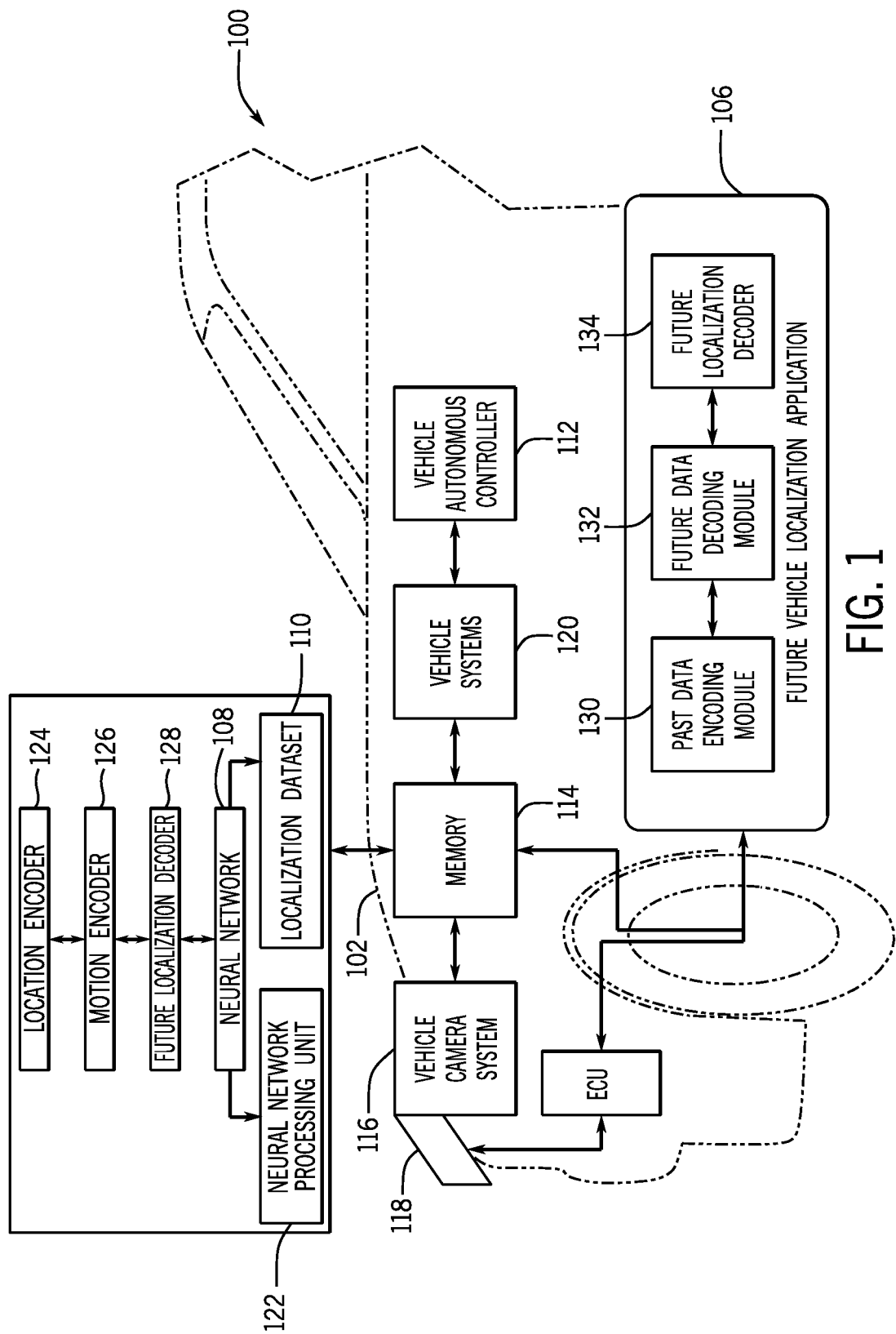
FIG. 1 is a schematic view of an exemplary operating environment for implementing systems and methods for egocentric-vision based future vehicle localization according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for egocentric-vision based future vehicle localization according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 includes an ego-vehicle (vehicle) 102 with an electronic control unit (ECU) 104 that executes one or more applications, operating systems, vehicle system and subsystem user interfaces, among others. The ECU 104 may also execute a future vehicle localization application (localization application) 106 that may be configured to complete egocentric-vision based vehicle localization to complete future localization of one or more vehicle and/or pedestrians classified herein as traffic participants (shown in FIG. 6) that are located within a surrounding environment of the vehicle 102. As discussed below, the future localization may include a prediction of future locations, positons, scales, depths, and trajectories of one or more traffic participants of the one or more traffic participants located within the surrounding environment of the vehicle 102. The surrounding environment may include an area including a vicinity of the vehicle 102. For example, the surrounding environment of the vehicle 102 may include an intersection at which the vehicle 102 is located (e.g., stopped) and/or a roadway on which the vehicle 102 is driven (e.g., lane of a highway).

As discussed below, the future localization application 106 may communicate with and utilize a neural network 108 to encode temporal information of past observations to provide location and scale information pertaining to the one or more traffic participants located within the surrounding environment of the vehicle 102. The future localization application 106 may also utilize the neural network 108 to encode a dense optical flow to provide pixel-level information about traffic participant motion, scale change, and appearance. Additionally, the future localization application 106 may further utilize the neural network 108 to decode future data based on the fused encoded outputs provided by encoding to thereby output a change in a predicted future location of a predicted future bounding box associated to each of the one or more traffic participants within the surrounding environment of the vehicle 102.

As discussed below, in some embodiments, the application 106 may also input data provided by a vehicle autonomous controller 112 of the vehicle 102 that pertains to planned future ego-motion of the vehicle 102 that may also be provided to the neural network 108 to decode and output information pertaining to predicted bounding boxes. In some configurations, the application 106 may also process information from various sources provided as inputs and may utilize the neural network 108 to provide various functions, that may include, but may not be limited to object classification, feature recognition, multilayer perceptions, and autonomous driving commands.

As discussed in more detail below, the neural network 108 may be configured as a multi-stream Recurrent Neural Network (RNN) and may include an encoder-decoder structure that includes a plurality of fully connected layers. The neural network 108 may utilize machine learning/deep learning to provide artificial intelligence capabilities that may be utilized to encode the temporal information and optical flow information from past observations and decode predicted future bounding boxes based on egocentric FPV images of the surrounding environment of the vehicle 102.

The neural network 108 may be configured to process the future vehicle localization information from the decoded predicted future bounding boxes and may build and maintain a localization dataset 110 that may be collected for one or more roadway environmental scenarios (e.g., intersection scenarios). In some embodiments, the application 106 may access and analyze the localization dataset 110 to provide motion planning capabilities while executing autonomous driving commands that may be provided to autonomously control the vehicle 102 to preemptively adapt to predicted future locations, positons, scales, depths, and trajectories of one or more traffic participants within the surrounding environment of the vehicle 102 and/or the vehicle 102. In additional embodiments, the application 106 may access and analyze the localization dataset 110 to provide warnings to a driver of the vehicle 102 that may be provided to warn/alert the driver for preemptive collision avoidance purposes based on the predicted future locations, positons, scales, depths, and trajectories of one or more traffic participants within the surrounding environment of the vehicle 102 and/or the vehicle 102.

With continued reference to FIG. 1, in addition to the ECU 104 and the vehicle autonomous controller 112, the vehicle 102 may include a plurality of components, for example, a memory 114, a vehicle camera system 116 that is operably connected to one or more cameras 118, and a plurality of vehicle systems 120. In an exemplary embodiment, the ECU 104 may be configured to operably control the plurality of components of the vehicle 102.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102. The ECU 104 may also include a communication device (not shown) for sending data internally in the vehicle 102 and communicating with externally hosted computing systems (e.g., external to the vehicle 102). Generally, the ECU 104 communicates with the memory 114 to execute the one or more applications, operating systems, vehicle system and subsystem user interfaces, and the like that are stored within the memory 114.

In one embodiment, the ECU 104 may operably control the vehicle autonomous controller 112 to process and execute an autonomous driving plan based on one or more of an intended destination of the vehicle 102, one or more traffic participants located within the surrounding environment of the vehicle 102, one or more future predicted locations of one or more of the traffic participants as determined by the future localization application 106, and/or one or more external factors that may include, but may not be limited to, a lane in which the vehicle 102 is traveling, status of traffic signals, traffic patterns, traffic regulations, etc. As discussed below, in some embodiments, the future localization application 106 may predict a future ego-motion of the vehicle 102 based on the autonomous driving plan processed by the vehicle autonomous controller 112.

In one embodiment, the vehicle autonomous controller 112 may additionally provide one or more commands to one or more of the vehicle systems 120 and/or one or more control units (not shown) of the vehicle 102, including, but not limited to an engine control unit, a braking control unit, a transmission control unit, a steering control unit, and the like to control the vehicle 102 to be autonomously driven based on the autonomous driving plan and/or data communicated by the application 106 to autonomously or semi-autonomously control the vehicle 102. In other words, the vehicle 102 may be autonomously driven based on one or more factors that may influence the autonomous driving plan (e.g., lane in which the vehicle 102 is traveling, status of traffic signals, traffic patterns, traffic regulations, etc.) and/or to preemptively adapt to predicted locations, positons, scales, depths, and trajectories of one or more traffic participants within the surrounding environment of the vehicle 102 based on encoding and decoding final hidden states output by the neural network 108.

In particular, the vehicle autonomous controller 112 may be configured to provide one or more commands (signals) to one or more of the vehicle systems 120 and/or control units to provide fully autonomous or semi-autonomous control of the vehicle 102. Such autonomous control of the vehicle 102 may be provided by sending one or more commands to control one or more of the vehicle systems 120 and/or one or more of the control units to operate (e.g., drive) the vehicle 102 during one or more circumstances (e.g., driver assist controls), and/or fully to control driving of the vehicle 102 during an entire trip of the vehicle 102.

The memory 114 may be configured to store one or more executable files associated with one or more operating systems, applications, associated operating system data, application data, vehicle system and subsystem user interface data, and the like that are executed by the ECU 104. In one or more embodiments, the memory 114 of the vehicle 102 may be accessed by the future localization application 106 to store data, for example, one or more egocentric FPV images of the surrounding environment of the vehicle 102. In some embodiments, the memory 114 may include one or more traffic participant models (not shown) associated with one or more types of traffic participants that represent values that include a range of sizes and features (based on image data) that are associated to different types of traffic participants.

In an exemplary embodiment, the memory 114 may include components of the neural network 108. As discussed above, the neural network 108 may be configured as a RNN that is configured to process computer/machine based/deep learning that may be centered on one or more forms of data that are provided to the neural network 108. In addition to being hosted on the memory 114, in some embodiments, the neural network 108, subsets of the neural network 108, and/or subsets of data may be used by the neural network 108 may be hosted on an externally hosted server infrastructure (not shown) that may be configured to communicate with the ECU 104 of the vehicle 102 through the communication device of the ECU 104.

In one or more embodiments, the neural network 108 may include a neural network processing unit 122 that may provide processing capabilities to be configured to utilize machine learning/deep learning to provide artificial intelligence capabilities that may be utilized to output data to the future localization application 106 and to build and maintain the localization dataset 110. The neural network processing unit 122 may process information that is provided as inputs and may utilize the localization dataset 110 to access stored future localization data to provide various functions, that may include, but may not be limited to, object classification, feature recognition, computer vision, speed recognition, machine translation, autonomous driving commands, and the like.

In an exemplary embodiment, the neural network 108 may be configured as a RNN encoder-decoder structure that is operably controlled by the neural network processing unit 122 and includes a location encoder 124, a motion encoder 126, and a future localization decoder 128. The location encoder 124 and motion encoder 126 may be configured as gated recurrent unit encoders. In an exemplary embodiment, the location encoder 124 may be configured to encode temporal information of past observations captured within one or more egocentric FPV images with respect to the past bounding box trajectory of the one or more traffic participants located within the surrounding environment of the vehicle 102. The location encoder 124 may thereby provide location and scale information pertaining to each of the one or more traffic participants located within the surrounding environment of the vehicle 102.

In one embodiment, the motion encoder 126 may be configured to encode dense optical flow information of motion, scale, and/or appearance change of one or more traffic participants and background captured within one or more egocentric FPV images. As discussed below, the application 106 may be configured to fuse the data output by the location encoder 124 and the motion encoder 126 to provide the encoded past location, scale, and corresponding optical flow fields of each of the one or more traffic participants located within the surrounding environment of the vehicle 102. The fused data may be communicated to the future localization decoder 128 to extrapolate future bounding box trajectories of each of the one or more traffic participants located within the surrounding environment of the vehicle 102.

More specifically, the future localization decoder 128 may be configured as a gated recurrent unit decoder that is configured to decode future bounding boxes based on the one or more egocentric FPV images of the surrounding environment of the vehicle 102. A hidden state of the future localization decoder 128 may be initialized by a final fused hidden state of the location encoder 124 and the motion encoder 126 to decode future bounding boxes to thereby allow the application 106 to output predicted locations, positons, scales, depths, and trajectories of one or more traffic participants within the surrounding environment of the vehicle 102 to be updated to the localization dataset 110. In some embodiments, the hidden state of the future localization decoder 128 may be initialized by the final fused hidden state of the location encoder 124 and the motion encoder 126 in addition to the future ego-motion of the vehicle 102 (based on the autonomous driving plan provided by the vehicle autonomous controller 112).

Figure 2:
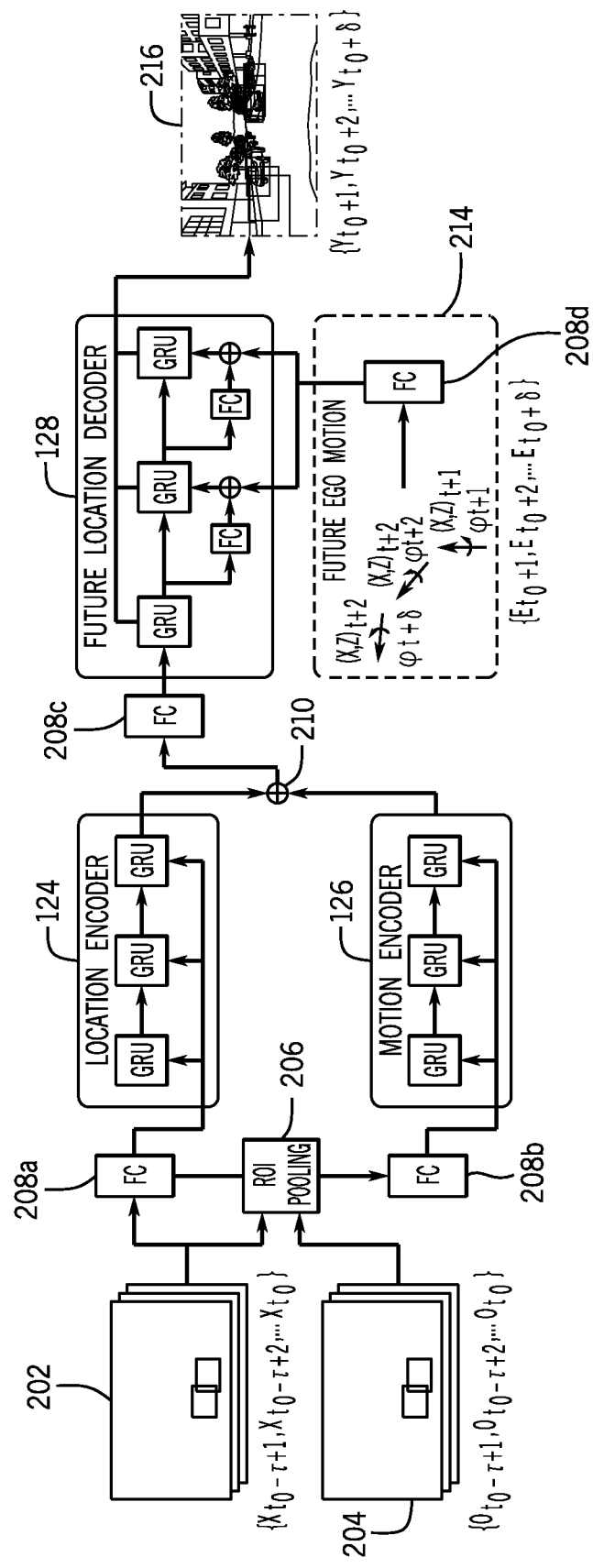
FIG. 2 includes an illustrative example of the RNN encoder-decoder structure of the neural network according to an exemplary embodiment of the present disclosure.

FIG. 2 includes an illustrative example of the RNN encoder-decoder structure of the neural network 108 according to an exemplary embodiment of the present disclosure. As discussed in more detail below, based on one or more commands provided by the future localization application 106 to the neural network processing unit 122 of the neural network 108, one or more past bounding box trajectories 202 of one or more traffic participants based on one or more egocentric FPV images may be encoded by the location encoder 124 to provide location and scale information.

As illustrated, the future localization application 106 may also provide one or more commands for the motion encoder 126 to encode a dense optical flow of the egocentric FPV image(s) associated with one or more traffic participants located within the surrounding environment of the vehicle 102 (e.g., dense optical flow fields) 204 to provide pixel level information of the motion, scale, and/or appearance change of each of the one or more traffic participants. In some embodiments, the future localization application 106 may additionally provide one or more commands to input future ego-motion data 214 associated with the ego-motion planning of the vehicle 102 to the future localization decoder 128. The future localization decoder 128 may be configured to decode and predict future bounding boxes 216 associated with the one or more traffic participants located within the surrounding environment of the vehicle 102. As discussed below, the future localization application 106 may thereby predict future locations, positons, scales, depths, and trajectories associated to each of the one or more traffic participants located within the surrounding environment of the vehicle 102 by evaluating the decoded hidden state with respect to the surrounding environment of the vehicle 102.

In some embodiments, the future predicted locations, positons, scales, depths, and trajectories of one or more traffic participants within the surrounding environment of the vehicle 102 may be provided as vehicle localization data that is added to the localization dataset 110. In some configurations, the application 106 may utilize the localization dataset 110 to provide motion planning capabilities while executing autonomous driving commands that may be provided to autonomously control the vehicle 102 to preemptively adapt to the predicted locations, positons, scales, depths, and trajectories of one or more traffic participants within the surrounding environment of the vehicle 102.

Referring again to FIG. 1, the vehicle camera system 116 may include one or more cameras 118 that are positioned at one or more areas of the surrounding environment of the vehicle 102. In an exemplary embodiment, the surrounding environment of the vehicle 102 may be defined as a predetermined area located in around (front/sides/behind) the vehicle 102 (e.g., road environment in front, sides, and/or behind of the vehicle 102) that may be included within the vehicle's travel path.

The one or more cameras 118 of the vehicle camera system 116 may be disposed at external front portions of the vehicle 102, including, but not limited to different portions of the vehicle dashboard, vehicle bumper, vehicle front lighting units, vehicle fenders, and the windshield. In one embodiment, the one or more cameras may be configured as RGB cameras that may capture RGB bands that are configured to capture rich information about object appearance, as well as relationships and interactions between the vehicle 102 and objects within the surrounding environment of the vehicle 102 which may include one or more traffic participants. The one or more cameras 118 may be configured to capture the egocentric FPV images (e.g., images, videos) of the surrounding environment of the vehicle 102 in one or more resolutions. For example, the one or more cameras 118 may be configured to capture video clips of a front facing surrounding environment of the vehicle 102 with 1920× 1200 resolutions and 10 fps.

As discussed, image data may be provided by the vehicle camera system 116 to one or more components of the future localization application 106 to be further evaluated and processed based on utilization of the neural network 108. In some embodiments, the application 106 may be configured to execute the image logic to perform feature extraction extract on the image(s). The image extraction may include the extraction of one or more spatial-temporal features and may pertain to object and scene recognition. In one embodiment, the image logic may also be utilized to determine one or more sets of image coordinates associated with one or more objects that may include, but may not be limited to, traffic participants (e.g., pedestrians, bikers, other vehicles), roadway attributes (e.g., lane markings, off-ramps, curbs), and road side objects (e.g., traffic light, stop sign).

In one or more embodiments, the vehicle systems 120 may include one or more systems that may be utilized to autonomously control the vehicle 102 and/or one or more functions and features of the vehicle 102. For example, the vehicle systems 120 may include, but are not limited to, any automatic or manual systems that may be used to enhance the vehicle driving. It is understood that the vehicle systems 120 may include various vehicle sensors (not shown) that sense and measure different stimuli (e.g., a signal, a property, a measurement, a quantity) associated with the vehicle 102 and/or a particular vehicle system 120.

For example, some vehicle sensors may include radar and laser sensors mounted to the exterior of the vehicle 102. The sensors may be any type of sensor, for example, acoustic, electric, environmental, optical, imaging, light, pressure, force, thermal, temperature, proximity, among others. In some embodiments, one or more of the vehicle systems 120 may include vehicle sensors for detecting objects surrounding the vehicle 102. For example, proximity sensors, radar sensors, laser sensors, LIDAR sensors, and other optical sensors, may be used to detect objects within the surrounding environment of the vehicle 102.

The vehicle systems 120 may include Advanced Driver Assistance Systems (ADAS), for example, an adaptive cruise control system, a blind spot monitoring system, a collision mitigation system, a lane departure warning system, among others that may be utilized to provide warnings/alerts to the driver of the vehicle 102 (e.g., if the vehicle 102 is being driven by a driver and not autonomously) for preemptive collision avoidance purposes based on the predicted locations, positons, scales, depths, and trajectories of one or more traffic participants within the surrounding environment of the vehicle 102 and/or the vehicle 102.

II. The Future Vehicle Localization Application and Related Methods

The components of the future localization application 106 will now be described according to an exemplary embodiment and with reference to FIG. 1 and FIG. 2. In an exemplary embodiment, the future localization application 106 may be stored on the memory 114 and executed by the ECU 104 of the vehicle 102. In another embodiment, the future localization application 106 may be stored on the externally hosted computing infrastructure and may be accessed by the communication device of the ECU 104 to be executed by the ECU 104 of the vehicle 102.

The general functionality of the future localization application 106 will now be discussed. In an exemplary embodiment, the future localization application 106 may include a past data encoding module 130, a future data decoding module 132, and a vehicle control module 134. As discussed in more detail below, the past data encoding module 130 may be configured to receive image data from the vehicle camera system 116 and utilize the neural network 108 to encode one or more past bounding box trajectories from one or more egocentric FPV images captured from the vehicle 102. The past data encoding module 130 may be further configured to encode dense optical flow associated with one of more traffic participants as a cue to be encoded by the motion encoder 126 based on one or more past bounding box trajectories to evaluate pixel level information for motion and appearance to thereby determine a pattern of relative motion in the surrounding environment of the vehicle 102.

As discussed in more detail below, the future data decoding module 132 may receive data pertaining to the final fused hidden state 210 of the location encoder 124 and the motion encoder 126 and may input the final fused hidden state 210 to the future localization decoder 128 to predict future bounding boxes 216 (e.g., one second in the future) in a future camera frame of the one or more traffic participants. The application 106 may thereby output a relative future location and scale of future bounding boxes from a current egocentric FPV image frame to accomplish future vehicle localization of each of the one or more traffic participants within the surrounding environment of the vehicle 102. The future localization may pertain to predicted locations, positons, scales, depths, and trajectories of one or more traffic participants within the surrounding environment of the vehicle 102 and may be further utilized to operably control one or more vehicle systems of the vehicle to be controlled to autonomously or semi-autonomously operate the vehicle 102. Methods and examples describing process steps that are executed by the modules 130-134 of the future localization application 106 will now be described in more detail.

Figure 3:
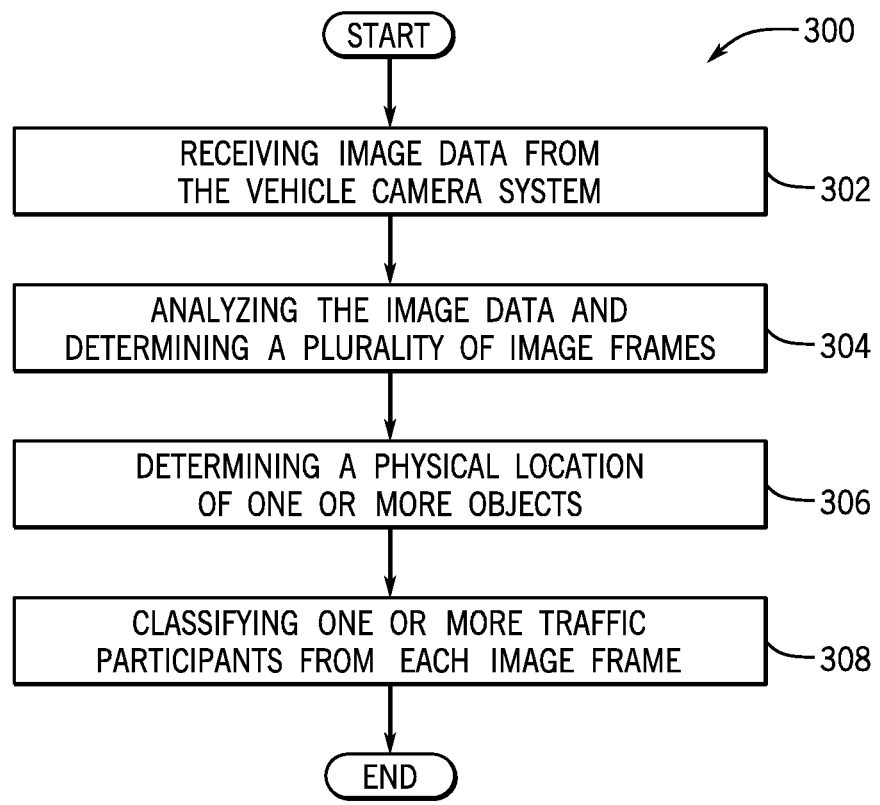
FIG. 3 is a process flow diagram of a method for encoding a past bounding box trajectory according to an exemplary embodiment of the present disclosure.

FIG. 3 is a process flow diagram of a method 300 for encoding a past bounding box trajectory according to an exemplary embodiment of the present disclosure. FIG. 3 will be described with reference to the components of FIG. 1 and FIG. 2, though it is to be appreciated that the method 300 of FIG. 3 may be used with other systems/components. The method 300 may begin at block 302, wherein the method 300 may include receiving image data from the vehicle camera system 116. In an exemplary embodiment, the past data encoding module 130 of the future localization application 106 may package and store image data pertaining to egocentric FPV images/video of the surrounding environment of the vehicle 102 captured by the one or more cameras 118. In one embodiment, the past data encoding module 130 may package and store the image data on the memory 114.

The method 300 may proceed to block 304, wherein the method 300 may include analyzing the image data and determining a plurality of image frames. In some embodiments, the past data encoding module 130 may utilize image logic to evaluate the image data and may utilize the neural network 108 to execute machine learning/deep learning to down sample the image data by lowering its sampling rate or same size. The down sampling may allow the bit rate to be decreased to more efficiently process the image data.

In one or more embodiments, the past data encoding module 130 may send one or more commands to the neural network 108 to convert the down sampled data into a plurality of image frames that may include one or more past image frames of image(s) that include one or more immediate past points in time from a current point in time to determine image data inputs of past image frames. The one or more immediate past points in time may include near past (e.g., instant past) point(s) in time of a current point in time that is received in the form of image data. In some embodiments, the past data encoding module 130 may also be configured to determine an image frame that includes a current image frame to determine image data input of the current image frame.

The method 300 may proceed to block 306, wherein the method 300 may include determining a physical location of one or more objects. In one embodiment, the past data encoding module 130 may execute the image logic to perform determine a physical location of one or more objects with respect to the vehicle 102. The past data encoding module 130 may extract one or more spatial-temporal features that pertain to object and scene recognition. In one embodiment, the image logic may also be utilized to determine one or more sets of image coordinates associated with one or more objects that may include, but may not be limited to, traffic participants (e.g., pedestrians, bikers, other vehicles), roadway attributes (e.g., lane markings, off-ramps, curbs), and road side objects (e.g., traffic light, stop sign) to determine a physical location of one or more objects with respect to the vehicle 102.

The method 300 may proceed to block 308, wherein the method 300 may include classifying one or more traffic participants from each image frame. In an exemplary embodiment, upon outputting the physical location of one or more objects, the past data encoding module 130 may extract features associated with one or more of the objects that are classified as traffic participants based on one or more sets of determined image coordinates. In one configuration, the past data encoding module 130 may access the memory 114 to compare the pixel locations and scale of the objects against one or more traffic participant models associated with one or more types of traffic participants that represent values that include a range of sizes and features that are associated to different types of traffic participants to classify one or more objects as traffic participants. In some embodiments, the past data encoding module 130 may utilize a Mask-RCNN (not shown) pre-trained on COCO dataset (not shown) for traffic participant detection. The past data encoding module 130 may utilize a Kalman filter for multiple traffic participant tracking for each image frame (e.g., of video) to thereby classify one or more traffic participants from each image frame.

The method 300 may proceed to block 310, wherein the method 300 may include encoding a past bounding box trajectory location. Upon classifying the one or more traffic objects, the past data encoding module 130 may compute bounding boxes around the one or more traffic participants with respect to the past image frames. With reference to FIG. 2, past bounding box trajectories 202 may be inputted by the past data encoding module 130 through the neural network processing unit 122 to a fully connected layer 208a of the neural network 108.

The past data encoding module 130 may access the neural network 108 to utilize the location encoder 124 to encode object location-scale observations for past bounding box trajectories associated with the past trajectories of the one or more traffic participants located within the surrounding environment of the vehicle 102. In one configuration, the past bounding box trajectory of each traffic participant may be computed by the past data encoding module 130 as:

$$X = \{x_{t0\_T+1}, x_{t0\_T+2}, \ldots, x_{t0}\}$$

where $x_t = [x_t, y_t, w_t, h_t]$ contains pixel coordinates of each traffic participant bounding box at time t (frames) together with its width and height in pixels.

The method 300 may proceed to block 310, wherein the method 300 may include encoding a past box trajectory. In an exemplary embodiment, the past data encoding module 130 may communicate with the neural network 108 to provide the past bounding box trajectory of each traffic participant through the fully connected layer 208a of the neural network 108 to the location encoder 124. In one embodiment, the past data encoding module 130 may encode the past trajectory with the past location, position, and trajectory of each traffic participant based on its pixel location and scale as specified by pixel coordinates of each traffic participant bounding box at time t together with its width and height in pixels. As an example, a past location, positon, and trajectory of another traffic participant located at the center of an image may be determined as a nearby vehicle or a distant vehicle from an opposite side of an intersection. Such differences may result in a different localization of the future location, position, and trajectory of the traffic participant(s).

In one or more embodiments, upon encoding the past bounding box trajectory associated with each of the one or more traffic participants within the surrounding environment of the vehicle 102, the location encoder 124 may communicate the past location, position, and trajectory of each traffic participant based on its pixel location and scale as specified by pixel coordinates of each traffic participant bounding box at time t together with its width and height in pixels to the past data encoding module 130 and may output a final hidden state associated with each of the encoded past bounding box trajectories. The final hidden state associated with each of the encoded past bounding box trajectories may be output as hidden state vectors of gated recurrent unit (GRU) models at a time t, where:

$$h_t^x = \text{GRUx}(\emptyset x(X_{t-1}), h_{t-1}^x; \theta_x)$$

where GRU is the gated recurrent units of the location encoder 124 with parameter $\theta$, $\emptyset$ are linear projections with ReLU activations, $h_t^x$ is the hidden state vector of the GRU models at time t. In one embodiment, upon outputting the hidden state vectors, the location encoder 124 may communicate the hidden state vectors to the past data encoding module 130. As discussed the final hidden state of the location encoder 124 may be further fused with a final hidden state of the motion encoder 126.

Figure 4:
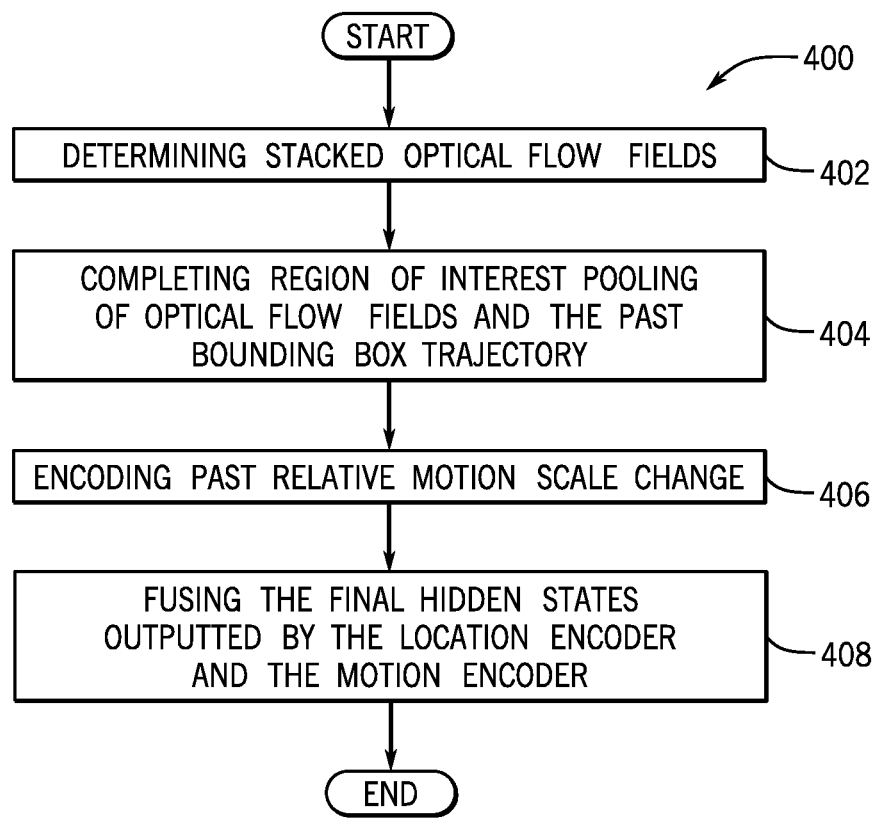
FIG. 4 is a process flow diagram of a method for encoding a past relative motion and scale change according to an exemplary embodiment of the present disclosure.

FIG. 4 is a process flow diagram of a method 400 for encoding a past relative motion and scale change according to an exemplary embodiment of the present disclosure, which will be described with reference to the components of FIG. 1 and FIG. 2, though it is to be appreciated that the method 400 of FIG. 4 may be used with other systems/components. In one or more embodiments, the method 400 may be executed by the past data encoding module 130 of the future localization application 106.

The method 400 may begin at block 402, wherein the method 400 may include determining stacked optical flow fields. As discussed above, upon encoding the past bounding box trajectory associated with each of the one or more traffic participants within the surrounding environment of the vehicle 102, the past data encoding module 130 may evaluate the past image frames based on the image data (as determined at block 304 of the method 300). In one embodiment, the past data encoding module 130 may evaluate pixel level information with respect to each of the pixels of the past image frames to determine a dense optical flow of the past image frames. The dense optical flow may provide a pattern of apparent motion change of one or more traffic participants between two consecutive image frames caused by the movement of the objects that may include one or more traffic participants.

In one configuration, the past data encoding module 130 may provide dense optical flow data as a vector field where each vector represents a displacement vector showing the movement of points from one image frame to a next image frame. In other words, for each feature point associated with a traffic participant, a vector [u, v] is used to describe the relative motion of the respective traffic participant resulting from the movement of the one or more respective cameras 118 that capture the image(s) from which the image frames were determined (at block 304) and the movement of the one or more traffic participants included within the image frames.

The dense optical flow offers an accurate estimation of every pixel. Accordingly, the past data encoding module 130 may distinguish moving objects such as traffic participants from background objects captured within the image frames. Also, the past data encoding module 130 may thereby describe a change in object appearance since different pixels on the objects may have different flows. Therefore, the dense optical flow may capture traffic participant motions as well as appearance information in the form of (staked) dense optical flow fields 204. The determined dense optical flow fields 204 may include optical flow maps (data) that may be further processed by the past data encoding module 130 and may be computer by the module 130 as $O=\{O_{t0-T+1}, O_{t0-T+2}, \ldots, O_{t0}\}$ for the past T frames.

The method 400 may proceed to block 404, wherein the method 400 may include completing region of interest pooling of optical flow fields and the past bounding box trajectory. In one embodiment, upon determining the stacked optical flow fields, the past data encoding module 130 of the future localization application 106 may utilize a region of interest pooling (ROIPooling) operation 206 to extract a feature(s) of each of the one or more traffic participants.

In an exemplary embodiment, the ROIPooling operation 206 may include the use of bilinear interpolation from the dense optical flow fields 204 and the past bounding box trajectories 202 associated with each of the one or more traffic participants located within the surrounding environment of the vehicle 102. Accordingly, an ROI region may be expanded from a bounding box associated with each traffic participant (e.g., which is computed around each traffic participant) that contains contextual information about the respective traffic participant.

The module 130 may be configured to extract traffic participant features by completing the ROIPooling operation 206. In other words, the pooled data may utilized to extract features associated with the one or more traffic participants based on data pertaining to the optical flow associated with one or more traffic participants enclosed within the one or more bounding boxes computed when determining respective past bounding box trajectories of the one or more traffic participants.

This functionality may ensure that the relative motion of each traffic participant with respect to the surrounding environment of the vehicle 102 is also encoded by the motion encoder 126, as discussed below. In one embodiment, the resulted relative motion vector is represented as:

$$O_t = [u_1, v_1, u_2, v_2, u_2, \ldots u_n, v_n]_{t,}$$

where n is the size of a pooled region. In one or more embodiments, upon completing the ROIPooling operation 206, the past data encoding module 130 may output pooled data based on the bilinear interpolation from the dense optical flow fields 204 and the past bounding box trajectory 202 of each of the one or more traffic participants located within the surrounding environment of the vehicle 102. The past data encoding module 130 may further input the pooled data through the neural network processing unit 122 to another fully connected layer 208b to be further inputted to the motion encoder 126, as discussed below.

The method 400 may proceed to block 406, wherein the method 400 may include encoding past relative motion and scale change. In an exemplary embodiment, upon completing the ROIPooling operation 206 and outputting pooling data to the fully connected layer 208b of the neural network 108, the past data encoding module 130 may communicate with the neural network processing unit 122 of the neural network 108 to input a data stream from the fully connected layer 208b to the motion encoder 126 of the neural network 108. The motion encoder 126 may be utilized for each input stem and may apply late fusion. Accordingly, a final hidden state of the location encoder 124 and the motion encoder 126 may be output to the future data decoding module 132 that is based on encoding by the location encoder 124 and the motion encoder 126.

In particular, the hidden state of the motion encoder 126 may be output as hidden state vectors of GRU models at a time t, where $$h_t^o = \mathrm{GRUo}(\emptyset o(O_{t-1}), h_{t-1}^o; \theta_o)$$

where GRU is the gated recurrent units of the motion encoder 126 with parameter θ, $\emptyset(\cdot)$ are linear projections with ReLU activations, and $h_t^o$ is the hidden state vector of the GRU models at time t. In one embodiment, upon outputting the hidden state vectors, the motion encoder 126 may communicate the hidden state vectors to the past data encoding module 130.

The method 400 may proceed to block 408, wherein the method 400 may include fusing the final hidden states outputted by the location encoder 124 and the motion encoder 126. In an exemplary embodiment, upon receiving the final hidden state associated with the past bounding box trajectory of each of the one or more traffic participants as outputted by the location encoder 124 (based on the execution of the method 300) and the final hidden state associated with the optical flow traffic participant features (based on block 406), the past data encoding module 130 may fuse (e.g., merge, aggregate) the final hidden states. In particular, the past data encoding module 130 may fuse the final hidden state of the location encoder 124 and the final hidden state of the motion encoder 126 to output a final fused hidden state 210. The final fused hidden state 210 may be output as hidden state vectors of GRU models at a time t, where $$H_b = \theta H_b (\text{Average}(h_{t_0}^x, h_{t_0}^o))$$

where parameters θ, Ø(·) are linear projections with ReLU activations, $h_t^x$ and $h_t^o$ are the hidden state vectors of the GRU models respectively of the location encoder 124 and the motion encoder 126 at time t. In an exemplary embodiment, upon fusing the final hidden states outputted by the location encoder 124 and the motion encoder 126, the past data encoding module 130 may communicate the final fused hidden state 210 as hidden state vectors of GRU models at a time t to the future data decoding module 132 of the future localization application 106.

As discussed below, the future data decoding module 132 may be configured to utilize the neural network 108 to predict future bounding boxes 216 (e.g., one second in the future) in a future camera frame of the one or more traffic participants located within the surrounding environment of the vehicle 102. The future data decoding module 132 may thereby output a relative future location and scale of future bounding boxes from a current egocentric FPV image frame to accomplish future vehicle localization of each of the one or more traffic participants within the surrounding environment of the vehicle 102.

Figure 5:
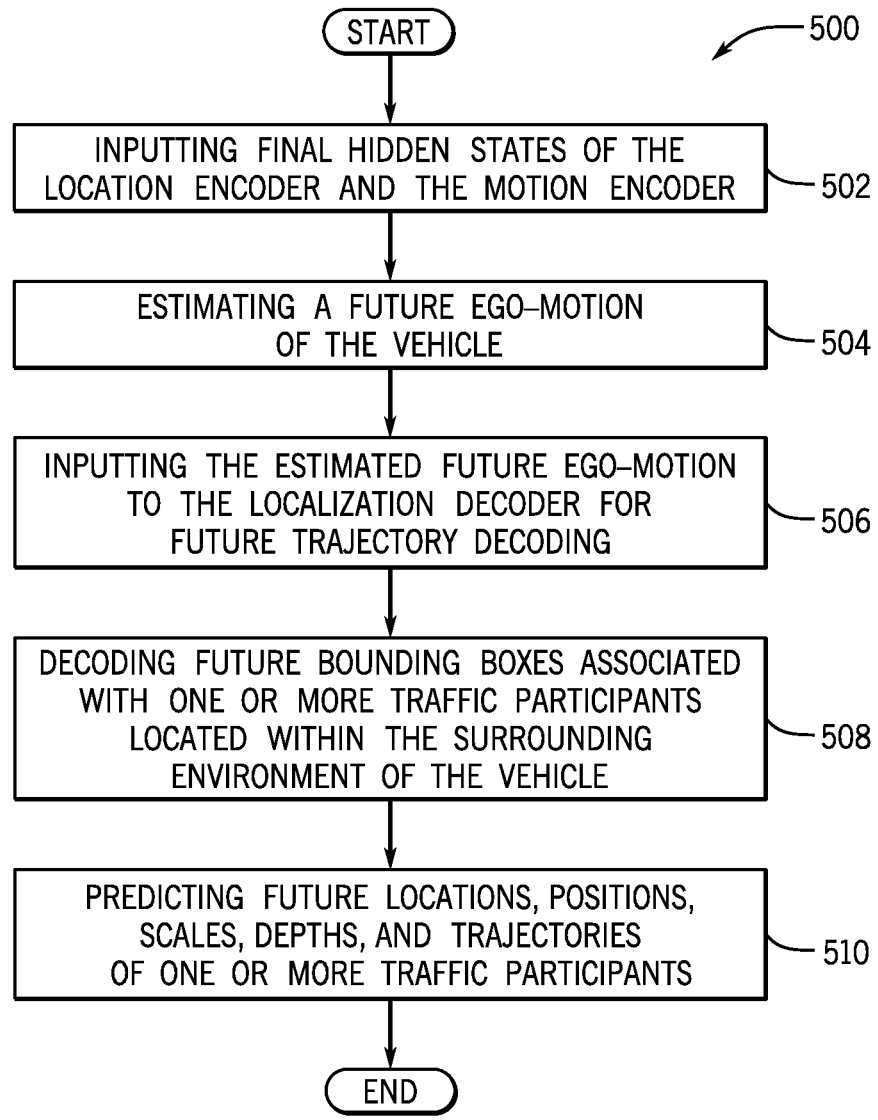
FIG. 5 is a process flow diagram of a method for decoding a future bounding box associated with each traffic participant according to an exemplary embodiment of the present disclosure.

FIG. 5 is a process flow diagram of a method 500 for decoding a future bounding box associated with each traffic participant according to an exemplary embodiment of the present disclosure, which will be described with reference to the components of FIG. 1 and FIG. 2, though it is to be appreciated that the method 500 of FIG. 5 may be used with other systems/components.

The method 500 may begin at block 502, wherein the method 500 may include inputting the final fused hidden state to the future localization decoder 128. As discussed above, upon fusing the final hidden states outputted by the location encoder 124 and the motion encoder 126, the past data encoding module 130 may communicate the final fused hidden state 210 as hidden state vectors of GRU models at a time t to the future data decoding module 132 of the future localization application 106.

The future data decoding module 132 may be configured to input the hidden state vectors of the final fused hidden state 210 through the neural network processing unit 122 to another fully connected layer 206c. Accordingly, the final fused hidden state 210 of the final hidden state of the encoded past bounding box trajectories (past vehicle locations) and the final hidden state of the stacked optical flow fields associated with each of the traffic participants located within the surrounding environment of the vehicle 102 may be inputted to the fully connected layer 208c. In an exemplary embodiment, the final fused hidden state 210 may be further outputted by the future data decoding module 132 to the future localization decoder 128 to utilize GRU(s) to decode future bounding boxes associated with the predicted future locations of the one or more traffic participants.

The method 500 may proceed to block 504, wherein the method 500 may include estimating a future ego-motion 214 of the vehicle 102. In one or more embodiments, the future data decoding module 132 may estimate the future ego-motion 214 of the vehicle 102 to provide additional data that may be instrumental in predicting the future locations of one or more traffic participants located in the surrounding environment of the vehicle 102. In one embodiment, block 504 may be executed as an optional process step if the vehicle 102 is configured as a semi-autonomous or fully autonomous vehicle.

As discussed above, the vehicle autonomous controller 112 of the vehicle 102 may process and execute an autonomous driving plan based on one or more of an intended destination of the vehicle 102, one or more traffic participants located within the surrounding environment of the vehicle 102, one or more future predicted locations of one or more of the traffic participants as determined by the future localization application 106, and/or one or more external factors that may include, but may not be limited to, a lane in which the vehicle 102 is traveling, status of traffic signals, traffic patterns, traffic regulations, etc.

In an exemplary embodiment, the future data decoding module 132 may be configured to estimate the future ego-motion associated with the vehicle 102 for predicting the future location of the traffic participants with respect to the moving vehicle 102. In other words, this functionality may determine an awareness of motion planning so that the future pose (positon, location, and trajectory) of the vehicle 102 may be estimated to aid in future location prediction of the one or more traffic participants located within the surrounding environment of the vehicle 102. Such planned ego-motion information may assist in anticipating motion caused by interactions between the vehicle 102 and one or more traffic participants. For example, if the vehicle 102 is estimated to turn left at an intersection, this estimation may assist in further estimating that one or more traffic participants may stop to yield or may accelerate to pass the vehicle 102.

Accordingly, the future data decoding module 132 may analyze the autonomous driving plan processed by the vehicle autonomous controller to estimate a future velocity, yaw rate, and heading of the vehicle 102 (e.g., one second in the future). In one embodiment, the future data decoding module 132 may represent the estimated future ego-motion by a rotation matrix $R_t^{t+1} \in R^{2 \times 2}$ and translation vectors $T_t^{t_0+1} \in R^2$ which together describe the transformation of camera coordinate frame from time t to t+1. Relative pair-wise transformations between frames may be composed to estimate transformations across a prediction horizon from a current frame:

$$R_{t_0}^{t_0+i} = \prod_{i=t_0}^{t_0+i-1} R_i^{t+i}$$

$$T_{t_0}^{t_0+i} = T_{t_0}^{t_0+i-1} + R_{t_0}^{t_0+i-1} T_{t_0+i-1}^{t_0+i}$$

The future ego-motion feature may be represented by a vector:

$$E_t = [\psi_{t_0}^t, x_{t_0}^t, z_{t_0}^t],$$

where t>$t_0$, $\psi_{t_0}^t$ is the estimated yaw angle extracted from $R_{t_0}^t$ and $x_{t_0}^t$ and $z_{t_0}^t$ are translations from a coordinate frame at time $t_0$. The future data decoding module 132 may utilize a right-handed coordinated fixed to the vehicle 102, where vehicle heading alights with positive x.

The method 500 may proceed to block 506, wherein the method 500 may include inputting the estimated future ego-motion to the future localization decoder 128 for future trajectory decoding. In an exemplary embodiment, upon estimating a future ego-motion of the vehicle 102, the future data decoding module 132 may thereby input the future ego-motion of the vehicle 102 to a fully connected layer 208d of the neural network 108 through the neural network processing unit 122. The future data decoding module 132 may input the estimated future ego-motion from the fully connected layer 208d to the future localization decoder 128 of the neural network 108 to utilize GRU(s) to decode future bounding boxes associated with the predicted future locations of the one or more traffic participants based on the final fused hidden state 210 and the estimated ego-motion of the vehicle 102.

The method 500 may proceed to block 508, wherein the method 500 may include decoding future bounding boxes associated with one or more traffic participants located within the surrounding environment of the vehicle 102. In an exemplary embodiment, the future data decoding module 132 may utilize the future localization decoder to decode future bounding boxes associated with each of the one or more traffic participants located within the surrounding environment of the vehicle 102. In one embodiment, the future localization decoder 128 may output a decoder hidden state that is initialized from the final fused hidden state 210 of the location encoder 124 (of the past bounding box trajectory input) and the motion encoder 126 (of the optical flow input). The future localization decoder 128 may compute a recurrent function:

$$h_{t+1}^Y = GRU_Y(f(h_t^Y, E_t), h_t^Y; \theta_Y)$$

In an exemplary embodiment, the future localization decoder 128 may output an estimated delta (change) of a future estimated bounding box trajectory from the past bounding box trajectory based on the GRU decoding the final fused hidden state 210 and the estimated ego-motion of the vehicle 102 as inputted to the future localization decoder 128. The decoder hidden state may be output as hidden state vectors of GRU models at a time t, where:

$$Y_{t_0+i} - X_{t_0} = \phi_{out}(h_{t_0+i}^Y)$$

where $h_t^Y$ is the decoder's hidden state, $h_{t_0}^Y = \mathcal{H}$ is the initial hidden state of the future localization decoder 128, and $\phi(\cdot)$ are linear projections with ReLU activations applied for domain transfer. The future localization decoder 128 accordingly generates a relative location and scale of each future bounding box associated with each of the one or more traffic participants from the image frame(s) (determined at block 302 of the method 300 and as represented by the equation above). The model output by the future localization decoder 128 is thereby shifted to have zero initial.

In one embodiment, the future localization decoder 128 may thereby provide the delta (change) in the future (predicted) bounding box locations and sizes from the past bounding box trajectory locations and sizes and may communicate the respective data to the future data decoding module 132. It is to be appreciated that the future localization decoder 128 may provide the delta in the future bounding box locations for a plurality of predicted future bounding boxes that may be associated to each of the one or more traffic participants located within the surrounding environment of the vehicle 102.

The method 500 may process to block 510, wherein the method 500 may include predicting future locations, positons, scales, depths, and trajectories of one or more traffic participants. In one embodiment, the future data decoding module 132 may utilize image logic (e.g., pre-programmed computer-logic) and may also communicate with the neural network 108 to provide machine learning/deep learning to provide artificial intelligence capabilities to predict a future location (e.g., physical location(s)), position (e.g., geopositon(s) with respect to the vehicle 102, direction(s) of travel with respect to the vehicle 102), scales (e.g., the physical size of the traffic participant(s)), depth (e.g., depth within an image that may be translated to distance between the traffic participant(s) and vehicle 102), and trajectory (e.g., traveling direction(s), path(s)), heading(s)) of the one or more traffic participants within the surrounding environment 600 of the vehicle 102.

Figure 6:
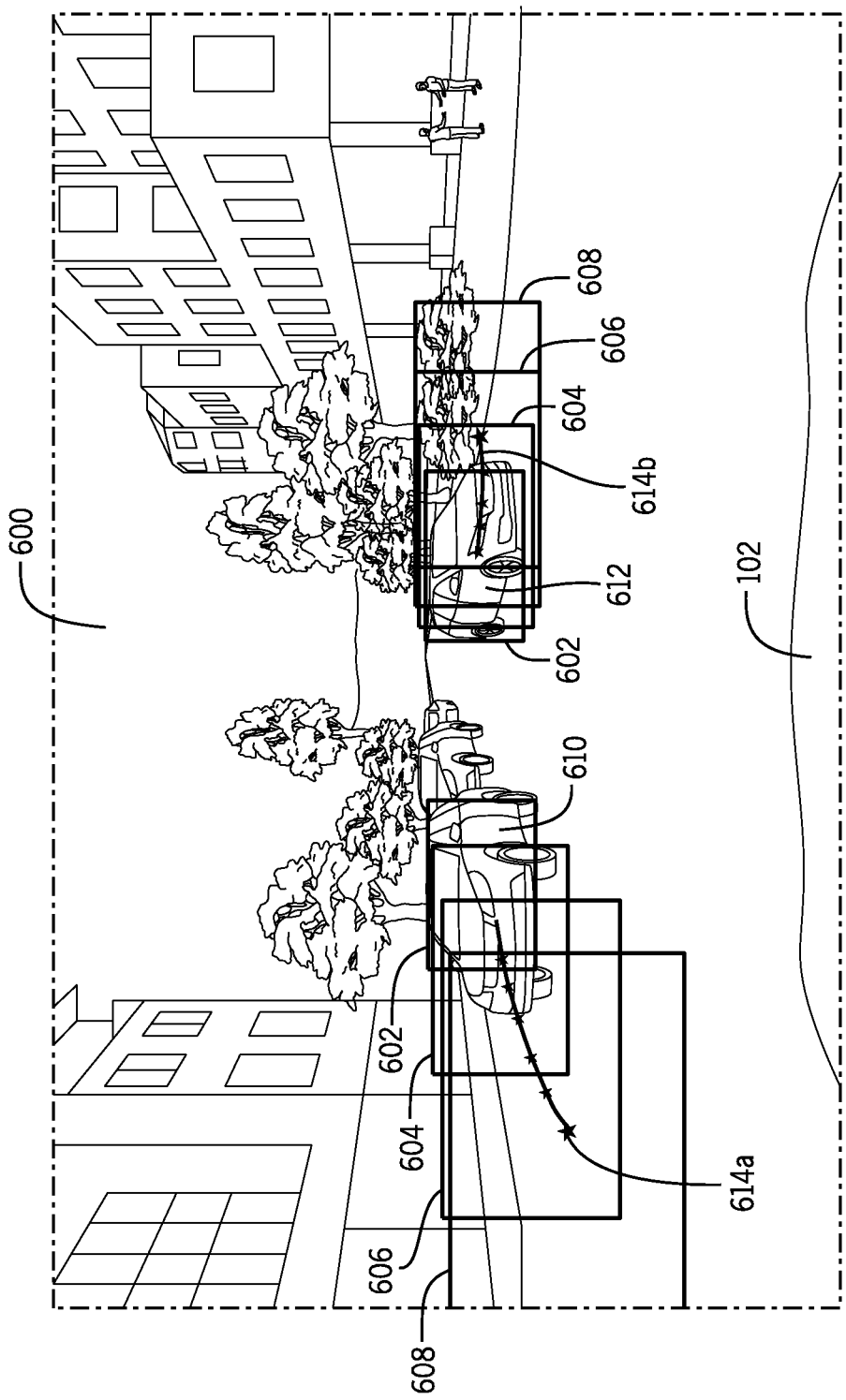
FIG. 6 is an illustrative example of decoding future bounding boxes from a past bounding box for each of the traffic participants located within the surrounding environment of the vehicle.

As shown in the illustrative example of FIG. 6, based on encoding completed by the location encoder 124, the motion encoder 126, and the determination of the future ego-motion, the future localization decoder 128 may decode future bounding boxes 604, 606, 608 from a past bounding box 602 for each of the traffic participants 610, 612 located within the surrounding environment of the vehicle 102. The future data decoding module 132 may accordingly predict the future locations, positons, scales, depths, and trajectories (represented by the exemplary lines 614a and 614b) of the traffic participants 610, 612 located within the surrounding environment 600 of the vehicle 102.

In an exemplary embodiment, the future data decoding module 132 may communicate respective data to the neural network 108 to thereby update the localization dataset 110 that may be collected for one or more roadway environmental scenarios (e.g., intersection scenarios). In one or more embodiments, the application 106 may access and analyze the localization dataset 110 to provide motion planning capabilities while executing autonomous driving commands that may be provided to autonomously control the vehicle 102 to preemptively adapt to predicted future locations, positons, scales, depths, and trajectories of one or more traffic participants within the surrounding environment of the vehicle 102. In additional embodiments, the application 106 may access and analyze the localization dataset 110 to provide warnings to a driver of the vehicle 102 that may be provided to warn/alert the driver for preemptive collision avoidance purposes based on the predicted future locations, positons, scales, depths, and trajectories of one or more traffic participants within the surrounding environment of the vehicle 102 and/or the vehicle 102.

Figure 7:
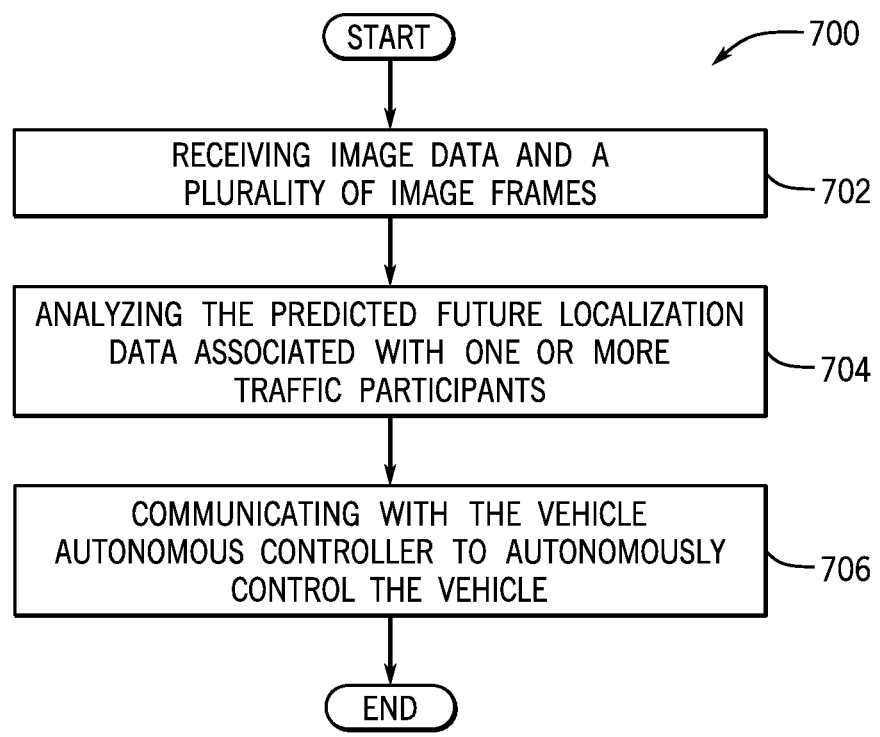
FIG. 7 is a process flow diagram of a method for controlling the vehicle to be autonomously driven to account for predicted future locations, positons, scales, depths, and trajectories of the one or more traffic participants located within the surrounding environment of the vehicle according to an exemplary embodiment of the present disclosure.

FIG. 7 is a process flow diagram of a method 700 for controlling the vehicle 102 to be autonomously driven to account for predicted future locations, positons, scales, depths, and trajectories of the one or more traffic participants located within the surrounding environment of the vehicle 102 according to an exemplary embodiment of the present disclosure, which will be described with reference to the components of FIG. 1 and FIG. 2, though it is to be appreciated that the method of FIG. 7 may be used with other systems/components. The method 700 may begin at block 702, wherein the method 700 may include receiving image data and a plurality of image frames. In one embodiment, the vehicle control module 134 may communicate with the vehicle camera system 116 to receive image data of the surrounding environment of the vehicle 102. The vehicle control module 134 may additionally communicate with the past data encoding module 130 to receive the plurality of image frames (determined at block 304).

The method 700 may proceed to block 704, wherein the method 700 may include analyzing the predicted future localization data associated with one or more traffic participants. In one or more embodiments, the future data decoding module 132 may also communicate data pertaining the predicted future locations, positons, scales, depths, and trajectories of the one or more traffic participants located within the surrounding environment of the vehicle 102 to the vehicle control module 134 of the future localization application 106. Upon receiving the image data and the plurality of image frames, the vehicle control module 134 may analyze the predicted future locations, positons, scales, depths, and trajectories of the one or more traffic participants located within the surrounding environment of the vehicle 102. The vehicle control module 134 may additionally determine one or more paths that may be traveled by the vehicle 102 in one or more future points in time based on the image data and the plurality of image frames. The one or more paths may also be determined on further analysis of the future ego-motion of the vehicle 102 based on the autonomous driving plan processed by the vehicle autonomous controller 112 (as discussed above).

In additional embodiments, the vehicle control module 134 may additionally communicate with the neural network 108 to access localization data from the localization dataset 110 that may pertain to one or more similar roadway environment scenarios in which the one or more traffic participants are located within a similar future locations, positons, scales, depths, and trajectories as predicted (at block 510). The data from the dataset 110 may be utilized to further refine one or more commands that may be sent to autonomously control the vehicle 102 to account for the environment in which the vehicle 102 is being driven and the predicted future locations, positons, scales, depths, and trajectories of the one or more traffic participants located within the surrounding environment of the vehicle 102.

The method 700 may proceed to block 706, wherein the method 700 may include communicating with the vehicle autonomous controller 112 to autonomously control the vehicle 102. In an exemplary embodiment, upon analyzing the predicted future locations, positons, scales, depths, and trajectories of the one or more traffic participants located within the surrounding environment of the vehicle 102, one or more paths that may be traveled by the vehicle 102 in one or more future points in time, and/or data from the localization dataset 110, the vehicle control module 134 may communicate one or more commands (e.g., data signals) to the vehicle autonomous controller 112 and/or the ECU 104 to autonomously control the vehicle 102 based on the predicted egocentric-vision based future vehicle localization of the one or more traffic participants located within the surrounding environment of the vehicle 102.

In one or more embodiments, the vehicle autonomous controller 112 may operably control one or more of the vehicle systems 120 to autonomously or semi-autonomously control the vehicle 102 based on the predicted egocentric-vision based future vehicle localization of the one or more traffic participants located within the surrounding environment of the vehicle 102. The vehicle autonomous controller 112 and/or the ECU 104 may communicate with one or more of the control units of the vehicle 102 to thereby control the vehicle 102 to be driven to control the vehicle 102 based on the predicted egocentric-vision based future vehicle localization of the one or more traffic participants located within the surrounding environment of the vehicle 102.

As an illustrative example, referring again to FIG. 6, the vehicle control module 136 may determine one or more discrete future actions that may be conducted by the vehicle 102 to account for the predicted future locations, positons, scales, depths, and trajectories (represented by the exemplary lines 614a and 614b) of the traffic participants 610, 612 located within the surrounding environment 600 of the vehicle 102. More specifically, the vehicle 102 may be controlled to execute one or more discrete actions that may be conducted in a particular manner(s) (e.g., with the application of a particular speed, acceleration, steering angle, throttle angle, braking force, etc.) to account for the estimated ego-motion of the vehicle 102 and the predicted future locations, positons, scales, depths, and trajectories (represented by the exemplary lines 614s and 614b) of the traffic participants 610, 612 located within the surrounding environment 600 of the vehicle 102. For instance, the vehicle 102 may be autonomously controlled to slow down and stop using a specific braking force based the estimated ego-motion of the vehicle 102 and the predicted future locations, positons, scales, depths, and trajectories (represented by the lines 614s and 614b) of the traffic participants 610, 612 located within the surrounding environment 600 of the vehicle 102.

In an additional embodiment, upon analyzing the predicted future locations, positons, scales, depths, and trajectories of the one or more traffic participants located within the surrounding environment of the vehicle 102, one or more paths that may be traveled by the vehicle 102 in one or more future points in time, and/or data from the localization dataset 110, the vehicle control module 134 may communicate one or more commands (e.g., data signals) to the ECU 104 to operably control one or more of the vehicle systems 120 accordingly to execute one or more discrete actions that may be conducted in a particular manner(s) to account for the estimated ego-motion of the vehicle 102 and the predicted egocentric-vision based future vehicle localization of the one or more traffic participants located within the surrounding environment of the vehicle 102.

Figure 8:
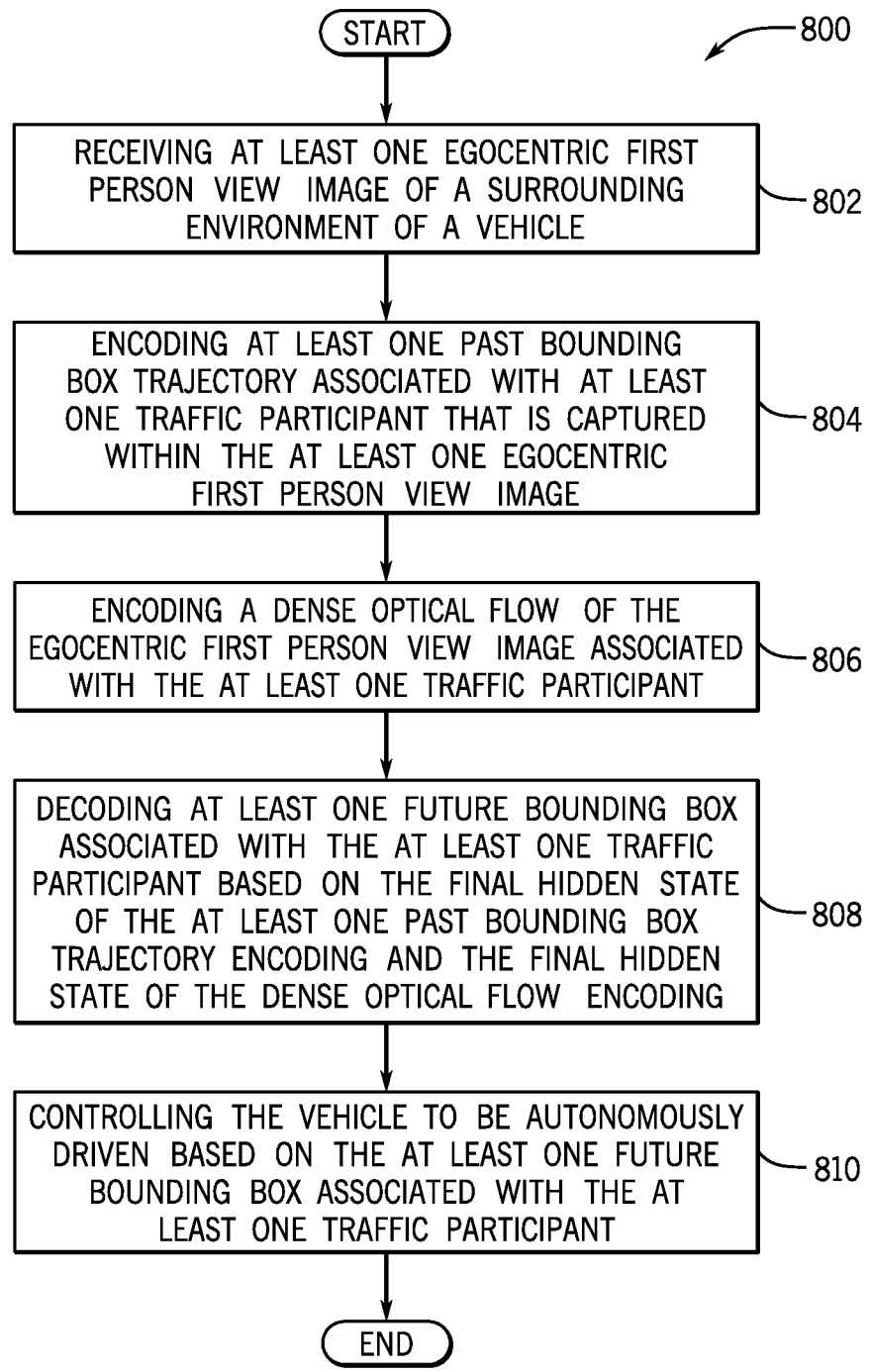
FIG. 8 is a process flow diagram of a method for egocentric-vision based future vehicle localization according to an exemplary embodiment of the present disclosure.

FIG. 8 is a process flow diagram of a method 800 for egocentric-vision based future vehicle localization according to an exemplary embodiment of the present disclosure, which will be described with reference to the components of FIG. 1 and FIG. 2, though it is to be appreciated that the method of FIG. 8 may be used with other systems/components. The method 800 may begin at block 802, wherein the method 800 may include receiving at least one egocentric first person view image of a surrounding environment of a vehicle 102.

The method 800 may proceed to block 804, wherein the method 800 may include encoding at least one past bounding box trajectory associated with at least one traffic participant that is captured within the at least one egocentric FPV image. In one embodiment, a final hidden state of the at least one past bounding box trajectory encoding is output. The method 800 may proceed to block 806, wherein the method 800 may include encoding a dense optical flow of the egocentric first person view image associated with the at least one traffic participant.

The method 800 may proceed to block 808, wherein the method 800 may include decoding at least one future bounding box associated with the at least one traffic participant based on the final hidden state of the at least one past bounding box trajectory encoding and the final hidden state of the dense optical flow encoding. The method 800 may proceed to block 810, wherein the method 800 may include controlling the vehicle 102 to be autonomously driven based on the at least one future bounding box associated with the at least one traffic participant.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for egocentric-vision based future vehicle localization, comprising:
receiving at least one egocentric first person view image of a surrounding environment of a vehicle;
encoding at least one past bounding box trajectory associated with at least one traffic participant that is captured within the at least one egocentric first person view image, wherein a final hidden state of the at least one past bounding box trajectory encoding is output;
encoding a dense optical flow of the egocentric first person view image associated with the at least one traffic participant, wherein a final hidden state of the dense optical flow encoding is output;
decoding at least one future bounding box associated with the at least one traffic participant based on a fusion of the final hidden state of the at least one past bounding box trajectory encoding and the final hidden state of the dense optical flow encoding; and
controlling the vehicle to be autonomously driven based on the at least one future bounding box associated with the at least one traffic participant.

2. The computer-implemented method of claim 1, wherein receiving the at least one egocentric first person view image includes extracting at least one spatial-temporal feature that pertains to an object and classifying the object as the at least one traffic participant based on a comparison of pixel locations and scale of the object against at least one traffic participant model.

3. The computer-implemented method of claim 2, wherein encoding the at least one past bounding box trajectory includes computing at least one bounding box around the at least one traffic participant as classified, wherein at least one past trajectory is computed based on the at least one past bounding box.

4. The computer-implemented method of claim 3, wherein encoding the at least one past bounding box trajectory includes encoding a past location, position, and trajectory the at least one traffic participant based on a pixel location and scale as specified by pixel coordinates of the at least one traffic participant bounding box at a time together with a width and height in pixels of the at least one egocentric first person view image of the at least one traffic participant.

5. The computer-implemented method of claim 1, wherein encoding the dense optical flow of the egocentric first person view image includes evaluating pixel level information with respect to each of the pixels of past image frames to determine the dense optical flow of past image frames, wherein a pattern of an apparent motion change of the at least one traffic participant between two consecutive image frames is caused by the movement of the at least one traffic participant.

6. The computer-implemented method of claim 5, wherein encoding the dense optical flow of the egocentric first person view image includes completing region of interest pooling of optical flow fields and the past bounding box trajectory, wherein a region of interest may be expanded from a bounding box to extract features associated with the at least one traffic participant.

7. The computer-implemented method of claim 1, further including fusing the final hidden state of the at least one past bounding box trajectory encoding and the final hidden state of the dense optical flow encoding, wherein a final fused hidden state is outputted as hidden state vectors of gated recurrent unit models at a particular time.

8. The computer-implemented method of claim 7, further including estimating a future ego-motion of the vehicle, wherein the future ego-motion of the vehicle is determined by an autonomous driving plan that is based on at least one of: an intended destination of the vehicle, a lane in which the vehicle is traveling, a status of a traffic signal, a traffic pattern, and a traffic regulation.

9. The computer-implemented method of claim 8, wherein decoding at least one future bounding box associated with the at least one traffic participant includes inputting the final fused hidden state and the future ego-motion of the vehicle to a future localization decoder to decode the at least one future bounding box associated with the at least one traffic participant.

10. A system for egocentric-vision based future vehicle localization, comprising:
a memory storing instructions when executed by a processor cause the processor to:
receive at least one egocentric first person view image of a surrounding environment of a vehicle;
encode at least one past bounding box trajectory associated with at least one traffic participant that is captured within the at least one egocentric first person view image, wherein a final hidden state of the at least one past bounding box trajectory encoding is output;
encode a dense optical flow of the egocentric first person view image associated with the at least one traffic participant, wherein a final hidden state of the dense optical flow encoding is output;
decode at least one future bounding box associated with the at least one traffic participant based on a fusion of the final hidden state of the at least one past bounding box trajectory encoding and the final hidden state of the dense optical flow encoding; and control the vehicle to be autonomously driven based on the at least one future bounding box associated with the at least one traffic participant.

11. The system of claim 10, wherein receiving the at least one egocentric first person view image includes extracting at least one spatial-temporal feature that pertains to an object and classifying the object as the at least one traffic participant based on a comparison of pixel locations and scale of the object against at least one traffic participant model.

12. The system of claim 11, wherein encoding the at least one past bounding box trajectory includes computing at least one bounding box around the at least one traffic participant as classified, wherein at least one past trajectory is computed based on the at least one past bounding box.

13. The system of claim 12, wherein encoding the at least one past bounding box trajectory includes encoding a past location, position, and trajectory the at least one traffic participant based on a pixel location and scale as specified by pixel coordinates of the at least one traffic participant bounding box at a time together with a width and height in pixels of the at least one egocentric first person view image of the at least one traffic participant.

14. The system of claim 10, wherein encoding the dense optical flow of the egocentric first person view image includes evaluating pixel level information with respect to each of the pixels of past image frames to determine the dense optical flow of past image frames, wherein a pattern of an apparent motion change of the at least one traffic participant between two consecutive image frames is caused by the movement of the at least one traffic participant.

15. The system of claim 14, wherein encoding the dense optical flow of the egocentric first person view image includes completing region of interest pooling of optical flow fields and the past bounding box trajectory, wherein a region of interest may be expanded from a bounding box to extract features associated with the at least one traffic participant.

16. The system of claim 10, further including fusing the final hidden state of the at least one past bounding box trajectory encoding and the final hidden state of the dense optical flow encoding, wherein a final fused hidden state is outputted as hidden state vectors of gated recurrent unit models at a particular time.

17. The system of claim 16, further including estimating a future ego-motion of the vehicle, wherein the future ego-motion of the vehicle is determined by an autonomous driving plan that is based on at least one of: an intended destination of the vehicle, a lane in which the vehicle is traveling, a status of a traffic signal, a traffic pattern, and a traffic regulation.

18. The system of claim 17, wherein decoding at least one future bounding box associated with the at least one traffic participant includes inputting the final fused hidden state and the future ego-motion of the vehicle to a future localization decoder to decode the at least one future bounding box associated with the at least one traffic participant.

19. A non-transitory computer readable storage medium storing instructions that when executed by a computer, which includes a processor perform a method, the method comprising:
 receiving at least one egocentric first person view image of a surrounding environment of a vehicle;
 encoding at least one past bounding box trajectory associated with at least one traffic participant that is captured within the at least one egocentric first person view image, wherein a final hidden state of the at least one past bounding box trajectory encoding is output;
 encoding a dense optical flow of the egocentric first person view image associated with the at least one traffic participant, wherein a final hidden state of the dense optical flow encoding is output;
 decoding at least one future bounding box associated with the at least one traffic participant based on a fusion of the final hidden state of the at least one past bounding box trajectory encoding and the final hidden state of the dense optical flow encoding; and
 controlling the vehicle to be autonomously driven based on the at least one future bounding box associated with the at least one traffic participant.

20. The non-transitory computer readable storage medium of claim 19, further including fusing the final hidden state of the at least one past bounding box trajectory encoding and the final hidden state of the dense optical flow encoding, wherein a final fused hidden state is outputted as hidden state vectors of gated recurrent unit models at a particular time.

* * * * *